(12) United States Patent
Faerber

(10) Patent No.: US 6,281,472 B1
(45) Date of Patent: Aug. 28, 2001

(54) METHOD AND PROCESS GAS FOR LASER WELDING METAL WORKPIECES

(75) Inventor: Mark Faerber, Hamburg (DE)

(73) Assignee: AGA Aktiebolag (SE)

( * ) Notice: Subject to any disclaimer, the term of this patent is extended or adjusted under 35 U.S.C. 154(b) by 0 days.

(21) Appl. No.: 09/297,647
(22) PCT Filed: Nov. 6, 1997
(86) PCT No.: PCT/EP97/06171
§ 371 Date: May 5, 1999
§ 102(e) Date: May 5, 1999
(87) PCT Pub. No.: WO98/19818
PCT Pub. Date: May 14, 1998

(30) Foreign Application Priority Data

Nov. 6, 1996 (DE) .............................. 196 45 746

(51) Int. Cl.⁷ .......................... B23K 26/20; B23K 26/32
(52) U.S. Cl. ........................................................ 219/121.64
(58) Field of Search ......................... 219/121.63, 121.64, 219/121.84

(56) References Cited

U.S. PATENT DOCUMENTS 3,066,215 * 11/1962 Espy ........................................ 219/74
5,488,216 * 1/1996 Farwer ............................ 219/121.64

FOREIGN PATENT DOCUMENTS

| 43 15 849 C1 | * | 6/1994 | (DE) . |
| 0 640 431 A1 | * | 7/1994 | (EP) . |
| 58-093592 | * | 6/1983 | (JP) . |
| 58-173094 | * | 10/1983 | (JP) . |
| 61-232087 | * | 10/1986 | (JP) . |
| 9-220682 | * | 8/1997 | (JP) . |

* cited by examiner

Primary Examiner—Geoffrey S. Evans
(74) Attorney, Agent, or Firm—Morrison & Foerster LLP

(57) ABSTRACT

A method for laser welding a metal workpiece comprises providing a process gas consisting essentially of helium and at least 0.5% by volume nitrogen and flushing a weld point with the process gas. The process gas contains no argon or neon and the metal workpiece includes aluminum or an aluminum alloy.

6 Claims, 1 Drawing Sheet

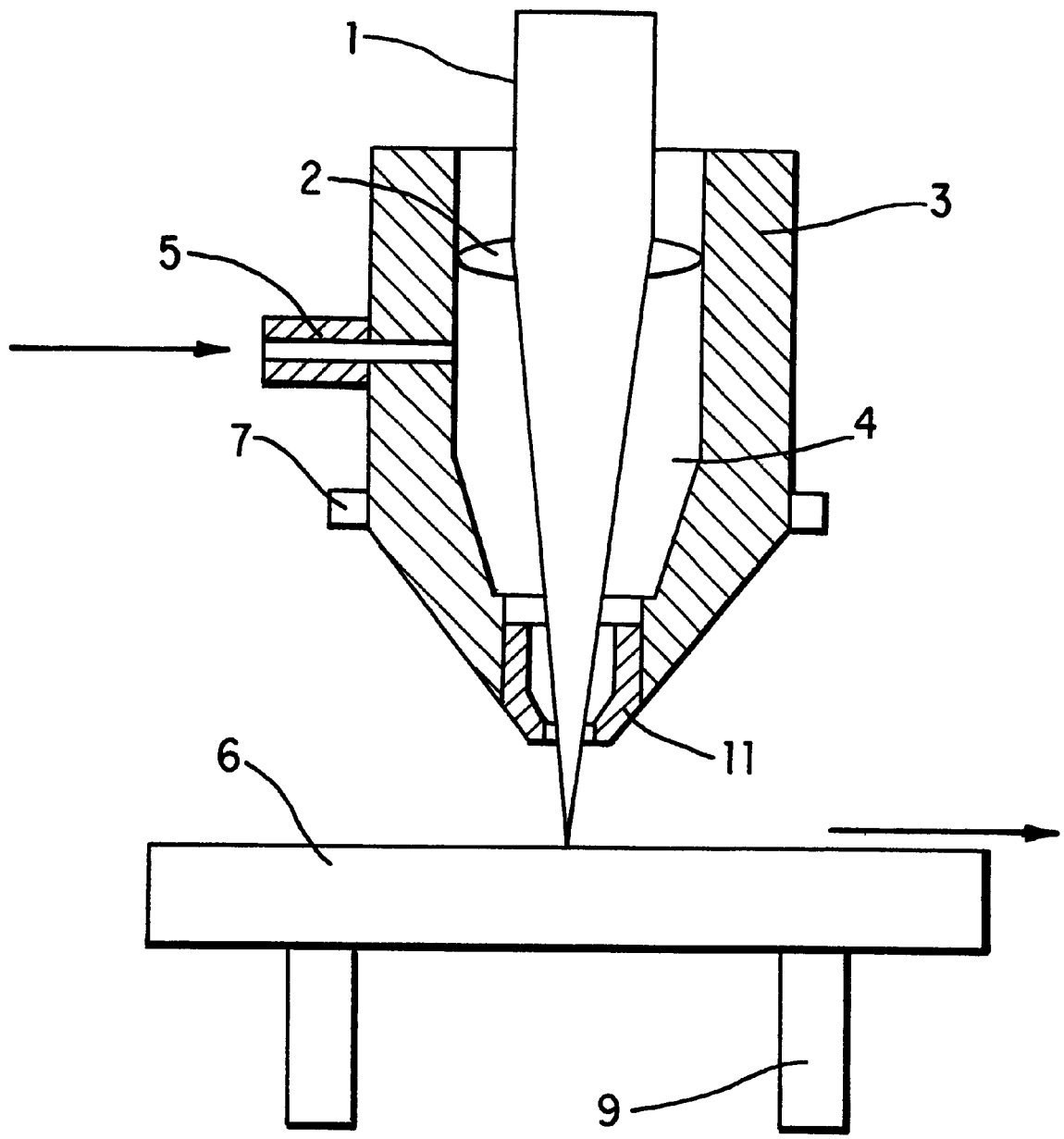

METHOD AND PROCESS GAS FOR LASER WELDING METAL WORKPIECES

FIELD OF THE INVENTION

The invention relates to a method and to a process gas for the laser welding of metal workpieces. In the method, the weld point is flushed with a process gas.

BACKGROUND

Laser welding is known from prior public use. In this technique, a laser beam is focused onto the workpiece which is to be welded. Often, a process gas which has to meet a number of demands is fed to the weld point at the same time. The intention is, on the one hand, to protect the laser optics used from spatter and contamination and, on the other hand, to prevent or limit undesirable reactions between the environmental atmosphere and the weld area. Generally, the process gas is directed through a nozzle which is coaxial with respect to the laser beam, although under certain circumstances a second nozzle which is directed transversely with respect to the laser beam may be used instead or in addition.

In the prior art, inert gases are generally used as the process gas. Nitrogen and argon are gases which are available at low cost, but they do have the drawback that the laser beam interacts with the nitrogen molecules or the argon atoms so as to form a process gas plasma which is undesirable for many applications, since it reduces the welding efficiency. Therefore, process gases which contain approximately ≧30% helium in argon are often employed. Helium suppresses plasma formation in the process gas.

SUMMARY OF THE INVENTION

The invention is based on the object of providing a method for laser welding of the type mentioned at the outset which allows efficient welding to be combined with a good quality of weld seam.

The invention achieves this object by using a mixture of at least one inert gas and at least 0.5% by volume of nitrogen as the process gas.

BRIEF DESCRIPTION OF THE DRAWINGS

FIG. 1 shows an embodiment of the welding apparatus.

DETAILED DESCRIPTION

Within the context of the invention, the term "process gas" means any gas mixture which is supplied to the area of the weld point during laser welding, for example in order to protect this area from the environmental atmosphere.

During laser welding, the energy can be transferred from the laser beam to the material to be welded in two ways. Firstly, there may be a direct interaction between the laser radiation and the workpiece material, in which case the workpiece material is vaporized or a metal vapour plasma is formed. Secondly, the laser radiation may interact with and ionize the process gas, so as to form a process gas plasma (not to be confused with the metal vapour plasma). This plasma formation in the process gas is known as a plasma flame. The process gas plasma in turn then transmits some of its energy to the workpiece.

The plasma flame formation in the process gas is in itself undesirable, since it reduces the efficiency of laser welding. Inert gases which exhibit little or no tendency to plasma formation are therefore preferable for laser welding.

Therefore, in the prior art pure helium or helium-argon mixtures with a high helium content (for example 50–70% by volume) are often used for laser welding (cf. DE 43 29 127 A1).

When the laser beam comes into contact with the workpiece, given a sufficient laser power, the result is a so-called keyhole, which is formed by spontaneous vaporization of the material and promotes deep penetration of the laser beam into the workpiece. In the case of metals which are not 100% pure or in the case of metal alloys, constituents of the material which have a comparatively low boiling point may vaporize explosively in the laser beam, and the resultant change in the pressure conditions may cause undesirable inclusions in the workpiece, such as for example pores. This can have a particularly disruptive effect in the case of workpieces made from aluminium and aluminium alloys, for example. Aluminium boils at 2467° C., whereas the magnesium which is present in many aluminium alloys boils at only 1107° C.

The invention has recognized that these undesirable occurrences, which impair the quality of the weld seam, can be suppressed by adding at least 0.5% by volume of nitrogen to the inert gas mixture. The nitrogen in the mixture is to a certain extent ionized and/or dissociated by the laser beam. It has been found that this formation of process gas plasma stabilizes the weld keyhole and suppresses undesirable explosive vaporization phenomena in the workpiece. The direct interaction of the laser beam with the metal is suppressed slightly, and the plasma flame which is formed to a certain extent is thought to act as a type of buffer which makes the welding operation more uniform and thus considerably improves the quality of the weld seam. Therefore, according to the invention, a slight deterioration in the welding efficiency as a result of plasma flame formation is deliberately accepted in order to obtain a higher-quality weld seam and to allow the process to be operated uniformly and safely.

Although it is already known from DE 43 29 127 A1, mentioned above, to use an inert gas which contains 80–250 vpm nitrogen or nitrous oxide as the protective gas during the laser welding of aluminium, this prior art is far removed from the present invention, since it expressly states that a nitrogen content of above 250 vpm has an adverse effect on the weld appearance and weld quality. The present invention has recognized that, surprisingly, nitrogen contents which are higher by a factor of at least 20 than the maximum content disclosed in this publication in fact result in significantly improved seam qualities. The results, inter alia, include deeper penetration and different pore formation.

It is particularly advantageous for the inert gas fraction in the process gas to be pure helium. Helium is only ionized to a very limited extent by the laser beam, and in this case the process gas plasma is formed essentially by ionization and/or dissociation of nitrogen. Although it is also possible for argon to be present in the inert gas mixture, this reduces the efficiency of the method according to the invention, since the ionization potential of argon is less than the ionization/dissociation potential of nitrogen.

The nitrogen content is preferably at least 1% by volume, more preferably at least 3% by volume, even more preferably at least 5% by volume, particularly preferably 10–50% by volume. It is even more preferable for the nitrogen content to be from 10–30% by volume. The optimum level of nitrogen in the process gas is also dependent on the materials to be welded. When welding aluminium and aluminium alloys, a nitrogen content of 10–15% by volume has proven advantageous, whereas when welding steels which contain austenitic microstructure constituents the preferred content is about 30% by volume. An excessive nitrogen content may lead to undesirable nitride formation, which may have an adverse effect on the dynamic and static strength properties of the weld joint.

The method or process gas according to the invention can be used with particular success for welding metal workpieces made from aluminium or an aluminium alloy. Such alloys are, for example, AlMgMn, AlMgSi, AlMg and AlZnMg. When using an Nd:YAG laser with a beam power of 3 kW, it is possible, by way of example, to weld workpieces which are up to 5 mm thick and are made from these alloys at rates of from 2–12 m per minute.

Other materials which can be welded according to the invention are steels which have austenitic microstructure constituents, for example austenitic steel or austenitic-ferritic steel.

In steels with austenitic microstructure constituents, such as for example austenitic stainless steels, duplex steels or superduplex steels, the nitrogen content in the process gas is thought to have a further effect. Dissociated nitrogen is incorporated in the material and contributes to stabilizing the austenite content in the microstructure of the weld seam.

The invention furthermore relates to a process gas for the laser welding of metal workpieces, which consists of a mixture of at least one inert gas and at least 0.5% by volume of nitrogen. The inert gas used is preferably helium. The preferred levels of nitrogen in the process gas have already been mentioned above in connection with the explanation of the method.

An exemplary embodiment of the invention is explained below with reference to the drawing shown in FIG. 1, which diagrammatically depicts essential components of a welding apparatus for carrying out the method according to the invention.

By means of a focusing lens 2, a laser beam 1 is directed onto the workpiece 5 which is to be welded. The beam passes through a nozzle 3 and its opening 11. The laser itself is not shown in the drawing; suitable lasers are known to the person skilled in the art. By way of example, it is possible to use a $CO_2$ laser or a solid-state laser, such as for example an Nd:YAG laser. Suitable beam powers lie, for example, in the range from 1–3 kW. Higher laser powers can also be employed if appropriate, but in this case it is preferable to use mirror optics for focusing the laser beam. The focusing lens 2 focuses the laser beam onto the top of the workpiece 6 which is to be welded. The diameter of the nozzle opening 11 may lie within the range from 3–15 mm, preferably 7–10 mm. The distance between the nozzle opening 11 and the surface of the workpiece 6 preferably lies in the range from 10–15 mm.

The nozzle 3 has a feedline 5, through which process gas is guided into a chamber 4. The process gas used is an He—$N_2$ mixture containing 10% by volume of nitrogen. The volume of process gas supplied is preferably 30 l/min (measured at standard temperature and pressure).

The metal sheet 6 which is to be welded is supported on a support device 9. In order to control or keep constant the working distance, the nozzle 3 may be equipped with a proximity sensor 7 (for example an inductive proximity sensor arrangement).

During the welding operation, the metal sheet 6 is guided through the welding apparatus at a speed of, for example, 6 m/min, in the direction of the arrow shown in FIG. 1. Most of the energy of the laser beam 1 interacts directly with the material of the metal sheet 6 in the area of the weld point. There is a limited interaction between the laser beam and the process gas as a result of dissociation and ionization of the process gas and consequent plasma formation, to the extent that the weld keyhole is stabilized. This advantageous action of the invention is particularly noticeable if high laser powers of above 3 kW (and appropriate mirror optics for focusing purposes) and a correspondingly high power density are used in the area of the weld point.

Within the context of the invention, the process may also be supplied in different ways, for example via a nozzle which is arranged at the side and is not shown in the drawing. Such a nozzle may be provided either in addition to or instead of the nozzle 3.

One example where the method according to the invention can be used is for welding austenitic stainless steel (AISI 304) with a material thickness of 2 mm. Another example of a material which can be welded to good effect is an aluminium alloy.

What is claimed is:

1. A method for laser welding a metal workpiece, comprising:

providing a process gas consisting essentially of helium and at least 0.5% by volume nitrogen and flushing a weld point with the process gas, wherein the process gas contains no argon or neon and the metal workpiece comprises aluminum or an aluminum alloy.

2. The method according to claim 1, wherein the nitrogen content is the process gas is at least 1% by volume.

3. Method according to claim 1 or 2, characterized in that the metal workpiece consists of aluminum or of an aluminium alloy.

4. The method according to claim 1, wherein the nitrogen content in the process gas is at least 3% by volume.

5. The method according to claim 1, wherein the nitrogen content in the process gas is at least 5% by volume.

6. The method according to claim 1, wherein the nitrogen content in the process gas is at least 10–50% by volume.

* * * * *